United States Patent [19]

Schoenig, Jr. et al.

[11] Patent Number: 4,577,565
[45] Date of Patent: Mar. 25, 1986

[54] DETECTION OF RADIOACTIVE ACCUMULATIONS WITHIN AN INCINERATOR

[75] Inventors: Frederick C. Schoenig, Jr., Wilmington, N.C.; Leonard N. Grossman, Bratenahl, Ohio

[73] Assignee: General Electric Company, San Jose, Calif.

[21] Appl. No.: 677,374

[22] Filed: Dec. 4, 1984

Related U.S. Application Data

[63] Continuation of Ser. No. 486,523, Apr. 19, 1983, abandoned.

[51] Int. Cl.$^4$ .............................................. F23G 7/00
[52] U.S. Cl. .................................. 110/237; 110/193; 110/336
[58] Field of Search ............... 110/119, 193, 235, 237, 110/242, 248, 249, 336; 422/159; 34/4, 77

[56] References Cited

U.S. PATENT DOCUMENTS

| | | | |
|---|---|---|---|
| 2,674,871 | 4/1954 | Hosbein | 110/336 |
| 2,713,124 | 7/1955 | Graham | 422/159 |
| 3,218,997 | 11/1965 | Berghout et al. | 110/193 |
| 3,922,974 | 12/1975 | Hempelmann | 110/119 |
| 4,276,834 | 7/1981 | Bregulla et al. | 110/237 |
| 4,290,908 | 9/1981 | Horiuchi et al. | 34/77 |
| 4,416,855 | 11/1983 | Abrams et al. | 110/237 |

Primary Examiner—Edward G. Favors
Assistant Examiner—Steven E. Warner
Attorney, Agent, or Firm—Ivor J. James, Jr.; Raymond G. Simkins

[57] ABSTRACT

Radiation detectors measuring gamma radiation from radioactive accumulations in an incinerator through low density refractory windows therein for burning combustible, contaminated wastes from nuclear fuel manufacturing activities.

9 Claims, 18 Drawing Figures

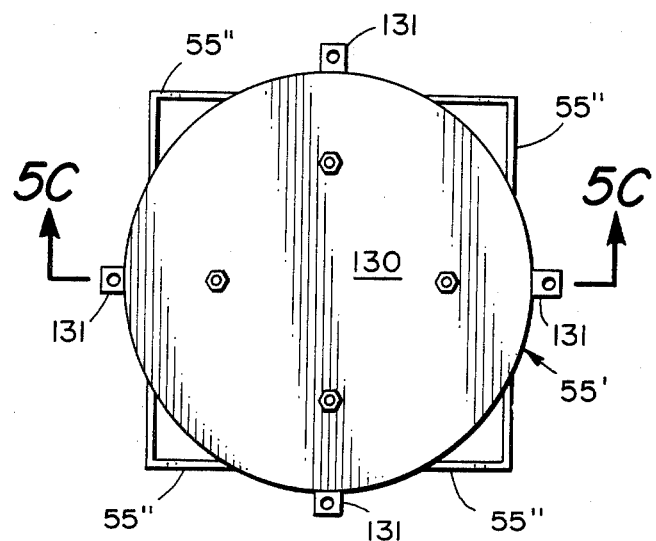
FIG. 5A
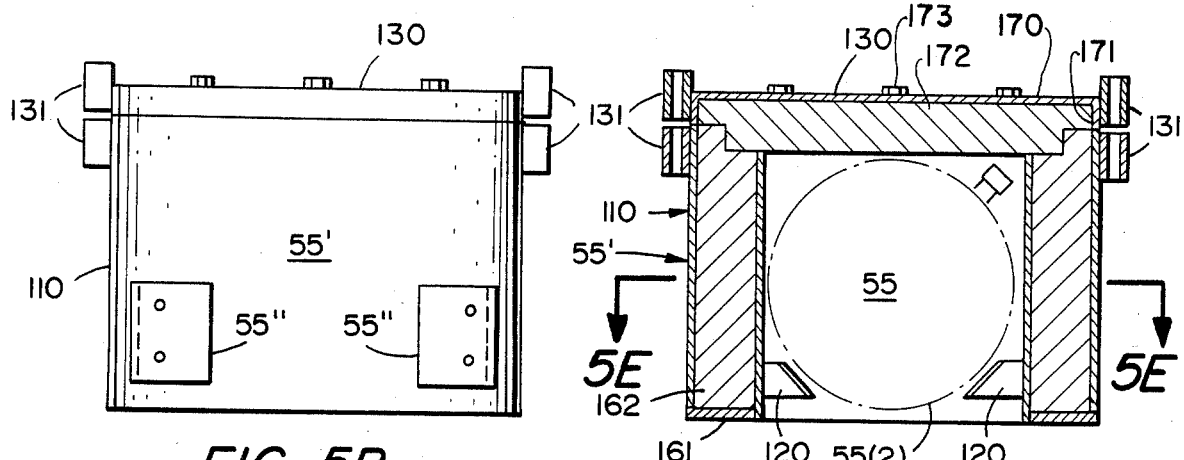
FIG. 5B
FIG. 5C
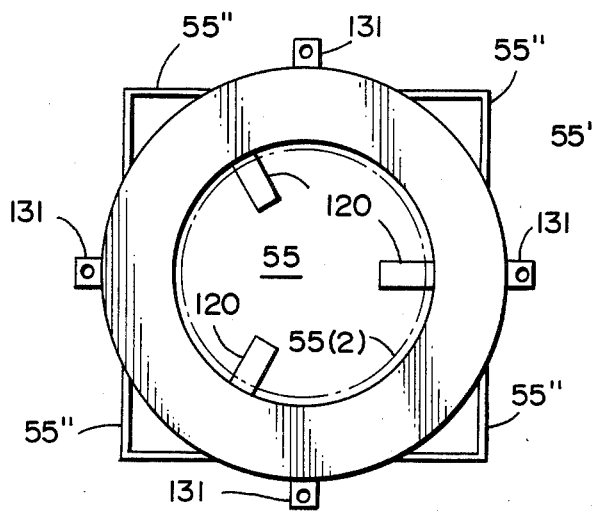
FIG. 5D
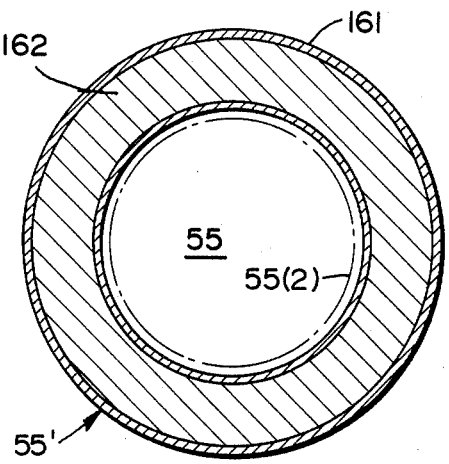
FIG. 5E

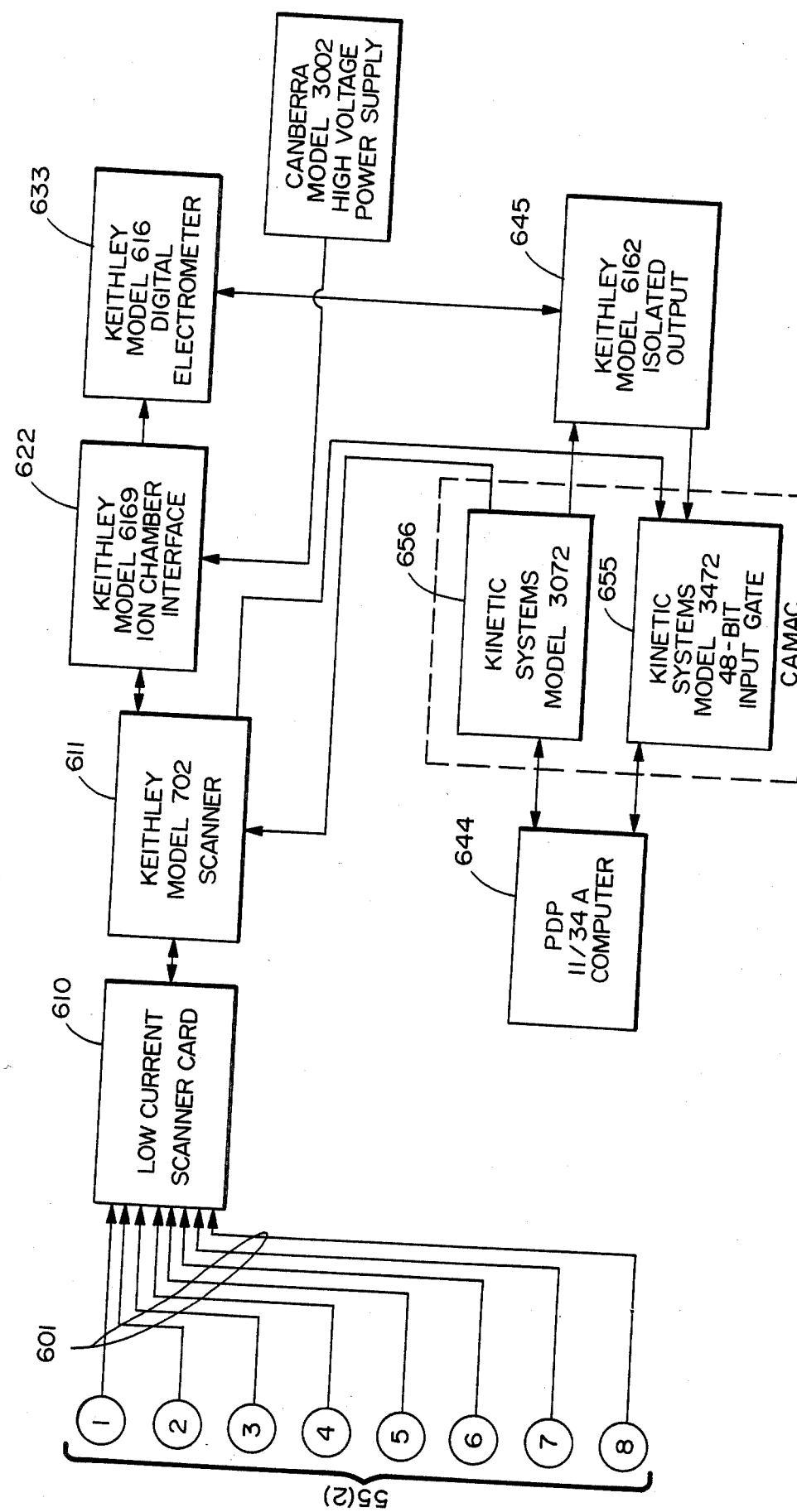

DETECTION OF RADIOACTIVE ACCUMULATIONS WITHIN AN INCINERATOR

This is a continuation of application Ser. No. 486,523, filed Apr. 19, 1983, now abandoned.

BACKGROUND AND SUMMARY

This invention relates to the art of incinerators for burning combustible materials contaminated to some extent by radioactivity. More particularly, the invention is directed toward the measurement of radioactive residuals in an automated incinerator system burning various kinds of combustible radioactively contaminated materials.

The manufacture of nuclear fuel requires personnel and equipment to come into contact to a limited extent with fissile and fertile radioactive substances such as uranium dioxide. Certain materials such as cloth, paper, rubber or plastic retain an amount of these radioactive substances and are deemed contaminated. Over time, such contaminated materials accumulate and are desirably disposed. Insofar as these materials are combustible, they can be burned in an incinerator. This reduces the quantity of material, diminishes the overall waste disposal problem to more manageable proportions, limits the consumption of financial resources, and generally provides a more satisfactory solution than the burial of the material.

One concern, however, is that the residual radioactive ash will accumulate in the incinerator and become critical. Most important, the mechanical elements moving the ashes out of the incinerator may, upon retracting, retain an excessive amount of radioactive ash in the incinerator. Some warning or detector indication of the amount of retained radioactive ash in the incinerator is required. In fact, to cover the entire inner surface of the incinerator, where ash is likely to accumulate, several detectors may be required.

Radiation detectors, however, are not likely to survive within the incinerator. Outside the incinerator on the other hand, the detectors are ineffective for detecting radioactive accumulations within because of the shielding effect of the massive walls of the incinerator.

Accordingly, it is an object of the instant invention to provide an arrangement that can detect radioactive accumulations at several locations within the incinerator containment.

Further, it is an object to construct an incinerator in a manner which enables radiation detectors to "see" into the incinerator and detect radioactive accumulations within.

It is an object to create an automated incinerator system capable of providing status indications of its own operability, specifically with regard to the level of radioactive accumulations within the incinerator.

Accordingly, an incinerator is provided with low density "windows" of refractory material, which windows protect radioactivity detectors from the heat within the incinerator while still permitting the detectors to detect the level of radioactivity accumulations in the incinerator behind the window.

DRAWING

The invention is illustrated by the following drawing in several figures showing a preferred embodiment thereof:

FIGS. 5A through 5E show various cross-sections and views of an ion detector and shield according to this invention, specifically in order; a top view, a side view, a vertical section 5C—5C, a bottom view, and a horizontal section at 5E—5E;

Figure 8A:
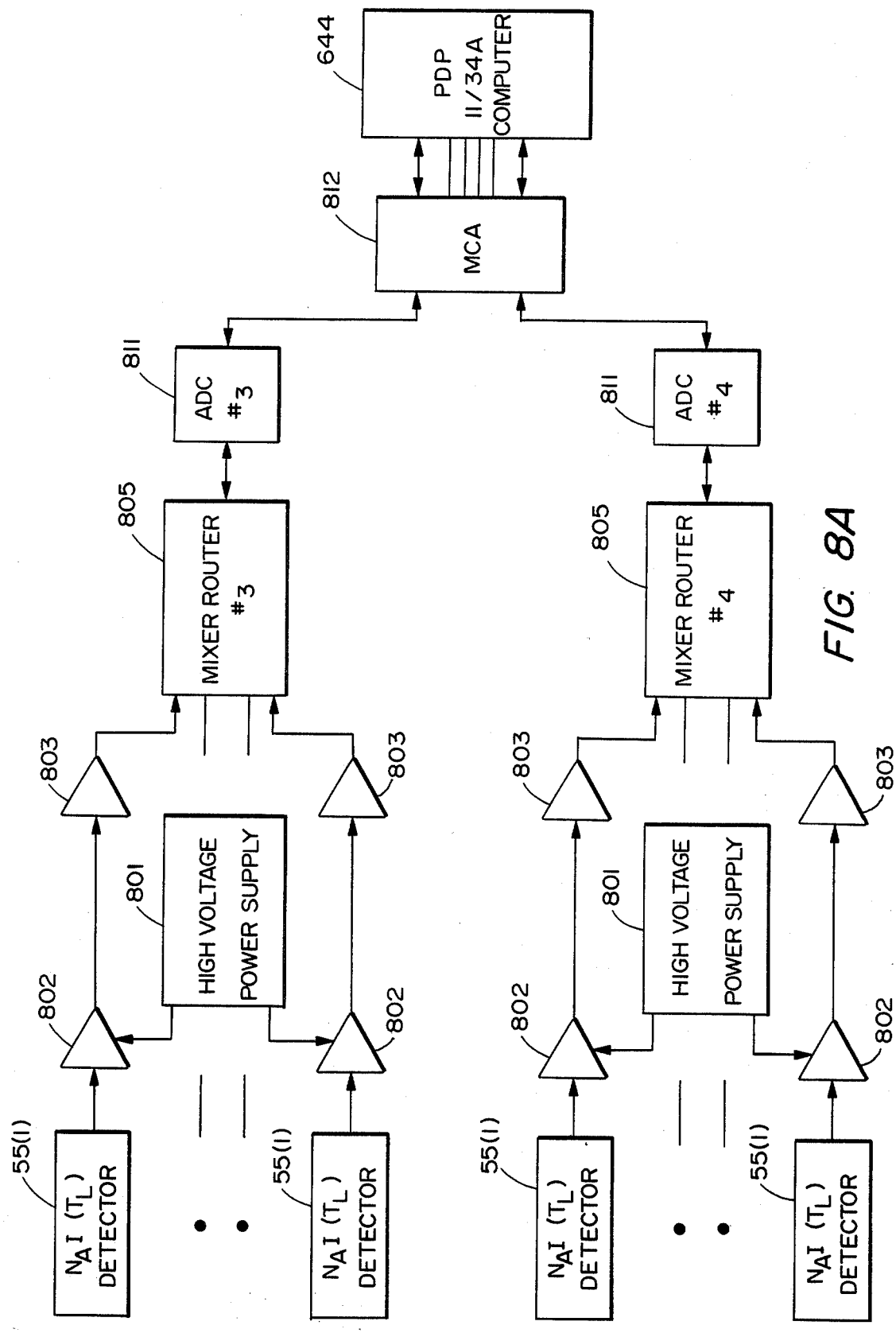

FIGS. 8A and 8B respectively show detector circuitry for sodium iodide and ion detectors.

DETAILED DESCRIPTION

Figure 1:
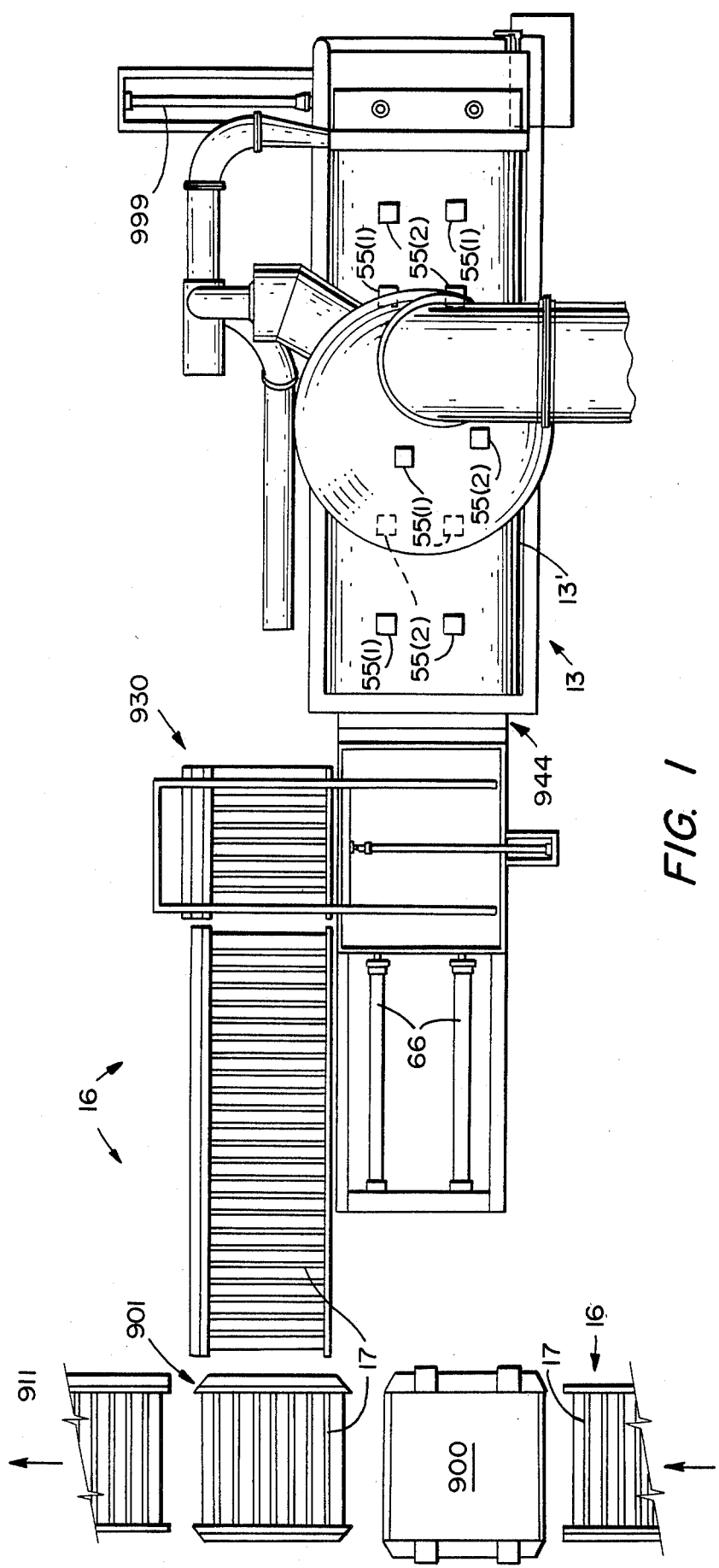
FIG. 1 is a view of the incinerator and a portion of the material handling system for feeding contaminated materials into the incinerator for combustion.

FIG. 1 shows a smokeless batch processing incinerator 13 manufactured by Comtro, a Division of Sunbeam Equipment Corporation according to General Electric Company specifications. The incinerator 13 has a high efficiency exhaust scrubber and effluent controls and radiological safety features. The incinerator does not require the shredding of uranium bearing materials prior to deposition in the incinerator. FIG. 1 shows a conveyor system 16 including rollers 17 for handling boxes (not shown) of contaminated combustible radioactive waste materials. The incinerator 13 includes an outer shell 13' of steel including a refractory liner 23 including refractory bricks (see FIG. 3). The incinerator 13 defines low density, i.e., low gamma absorption cross-section, windows 44 discussed in detail below. These windows 44 have a density about an order of magnitude less than the walls of the incinerator 23 otherwise. This permits the external detection of gamma rays from accumulated decaying fissile and fertile materials by detectors 55 mounted adjacent the incinerator low density windows.

Figure 2:
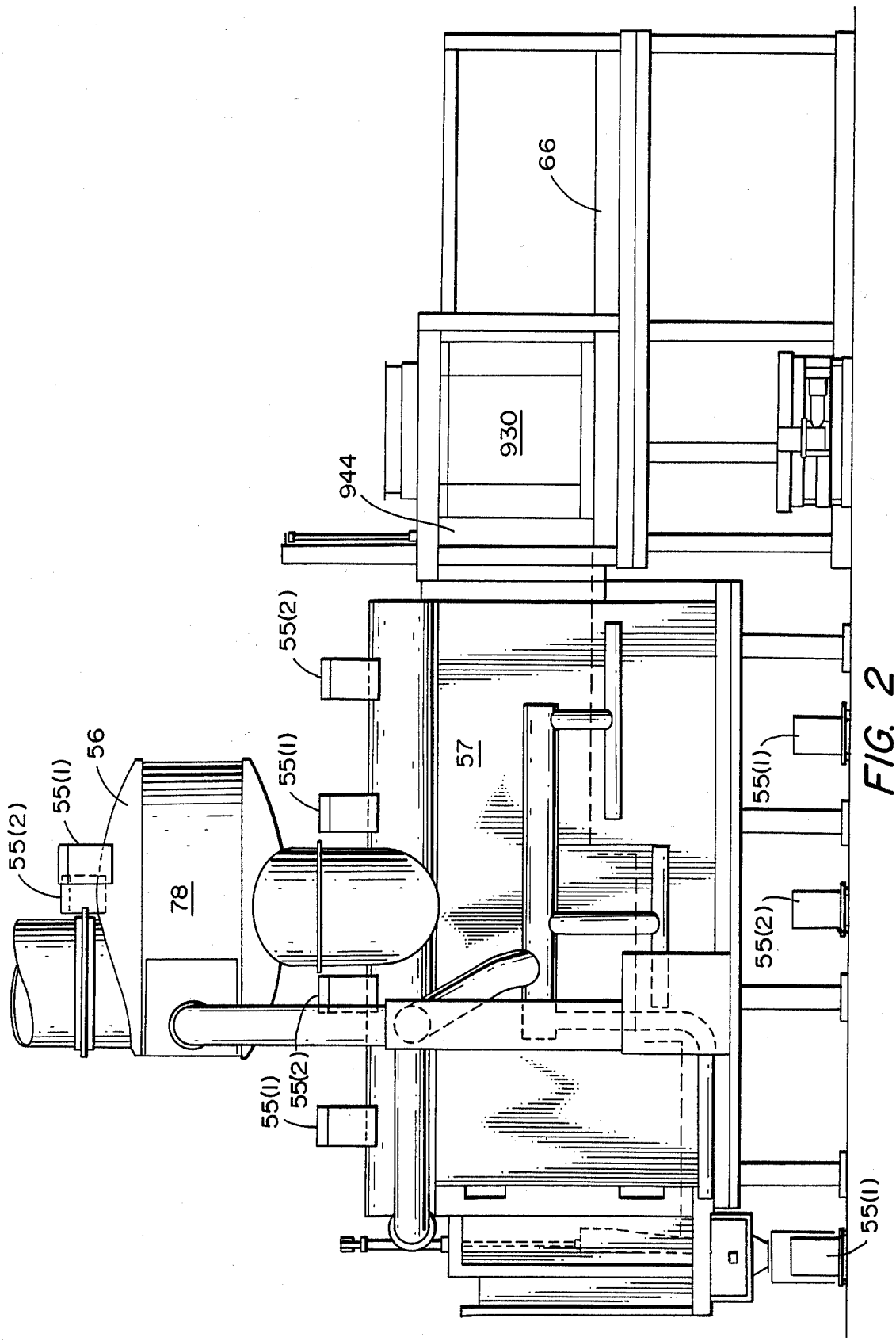
FIG. 2 is a side elevational view of the incinerator and a portion of the loading structure.
Figure 3:
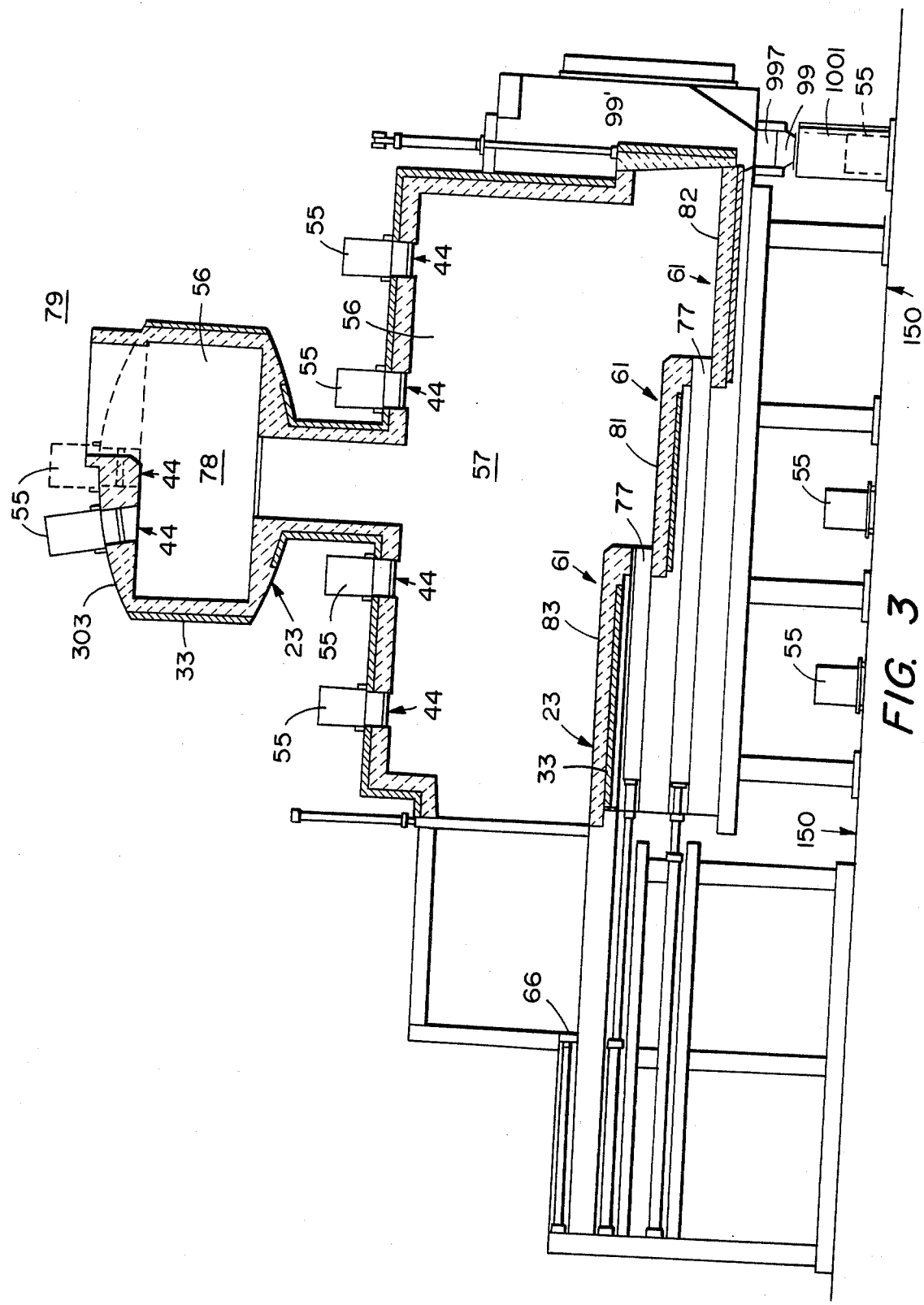
FIG. 3 is a vertical cross-section of the incinerator in a longitudinal sense.
Figure 4:
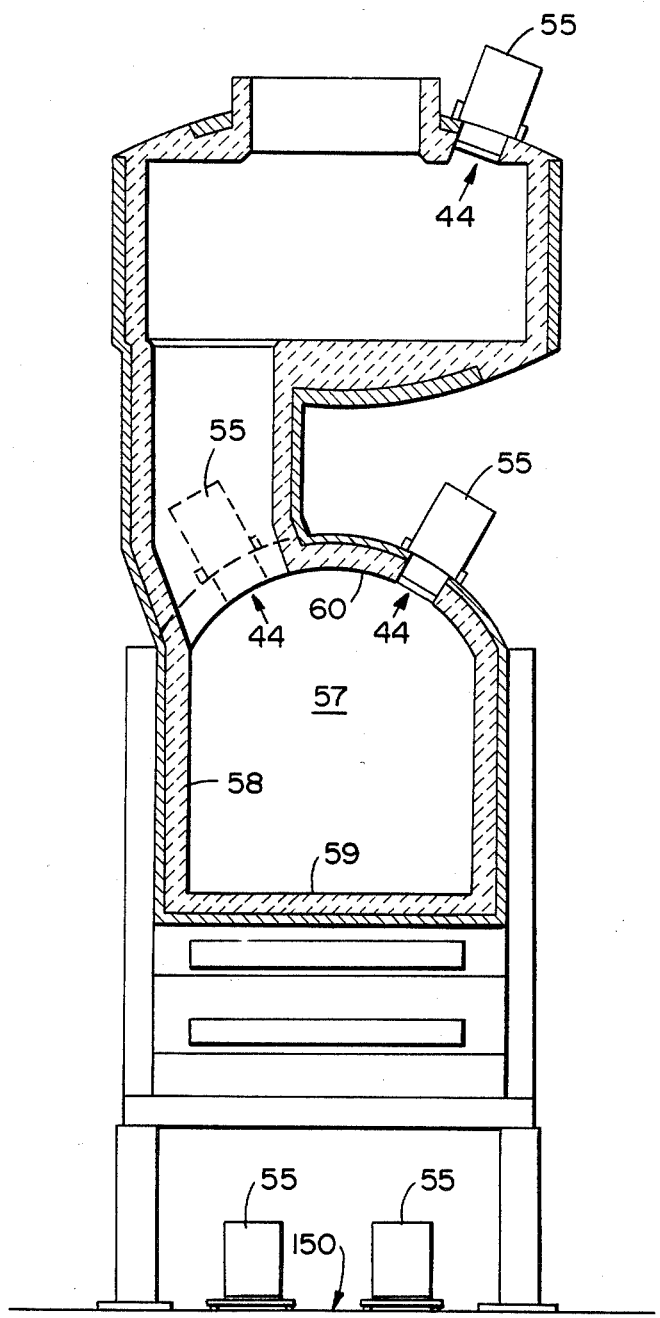
FIG. 4 shows the incinerator in a vertical cross-section taken transversely.
Figure 6A:
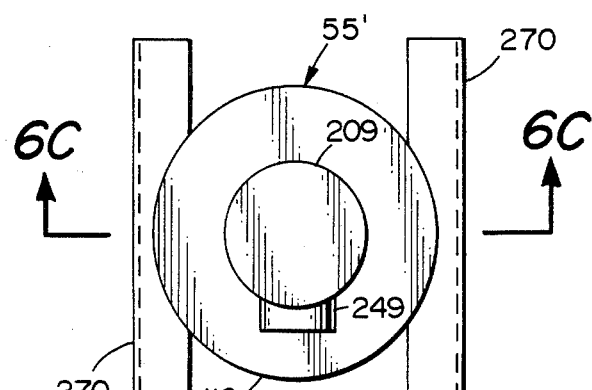
FIGS. 6A through 6E show similar views and cross sections of a sodium iodide detector and shield arrangement, again respectively; a top view, a side view, a vertical section 6C—6C, a bottom view, and a horizontal section at 6E—6E.
Figure 6B:
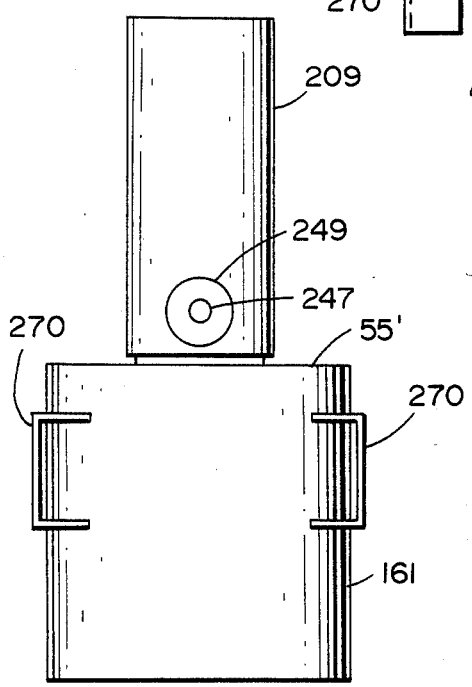
Figure 6C:
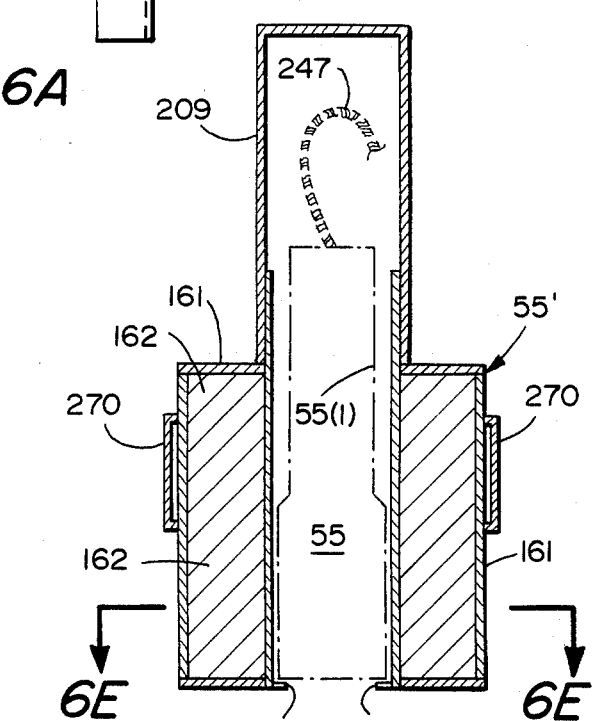
Figure 6D:
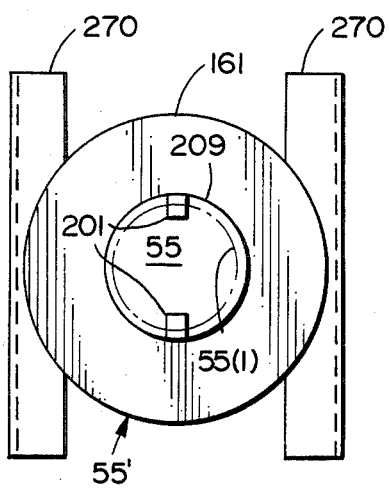
Figure 6E:
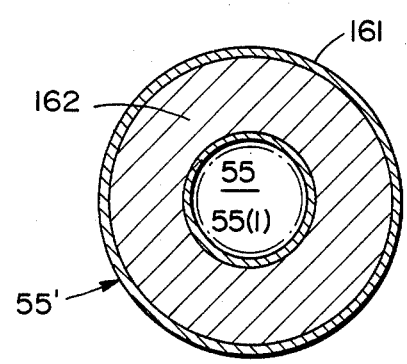

FIG. 2 shows the incinerator 23 having a two-stage refractory chamber 56 including a primary burn chamber 57 in the form of a loaf of bread having square sides 58 and bottom 59 but a rounded ceiling. FIG. 4 clearly shows the rounded ceiling 60 of the primary burn chamber 59. FIG. 3 shows the interior of the primary burn chamber including the floor of the incinerator 23 which is in several levels. An external loader ram 66 for the boxes is shown. Additionally, internal hydraulic plows 77 are shown for the middle and lower levels. A secondary or upper burn chamber 78 is provided to fully burn combustion gases and residual natural gas provided to heat the lower burn chamber 57 to a temperature of up to 1700° F. This removes substantially the carbon content of the gases. The upper burn chamber 78 leads to ducts 79 at the entrance of a scrubber system (not shown) which processes the residual flue gases.

Radiation detectors 55 including a distribution of sodium iodide 55(1) and ion detectors 55(2) are provided adjacent the primary and secondary combustion chambers 57, 78. Detectors 55 specifically view the interior of the incinerator 13 through low density windows 44 extending through the brick 33 and other refractory material 23 of the containment of the incinerator 13. This enables the detectors 55 to look inside the incinerator 13 for radioactive accumulations. The detectors 55 are mounted adjacent both the tops of the combustion chambers 57, 78 and on the underside of the primary burn chamber 57 and specifically under the internal plows 77. These plows 77 inadvertently withdraw an amount of radioactive ash under the floor 61 of the incinerator 13 upon return from a clearing sweep of the middle and lower levels of the incinerator respectively 81 and 82. Accordingly, detectors 55 are required under the upper and middle levels respectively 83 and 81, of the primary burn chamber 57.

The field of view of the sodium iodide 55(1) and ion detectors 55(2) FIGS. 1 and 2 is on the order of 5 to 10 square feet, depending upon the precise location of the detector 55. FIG. 1 shows a single sodium iodide and ion chamber detector on top of the upper chamber 78 of the incinerator 13. The primary chamber 57 has 8 detectors on the top thereof, 4 of one kind (sodium iodide), and 4 of the other kind (ion chamber). The detectors 55 are interspersed vis-a-vis one another to provide a desired level of redundancy and diversity. Six floor mounted detectors are seen positioned under the primary chamber (FIG. 2 and FIG. 3) of the incinerator 13. In the side view of FIG. 3, two detectors (one behind the other—see FIG. 4) are shown under respective hydraulic plows 77. Similarly, there are two detectors 55 under the ash trough 99 of the discharge end of the incinerator 13. One of the detectors 55 is a sodium iodide detector; the other, an ion detector.

The radiation detectors 55 measure gamma rays from the accumulated fertile and fissile material including uranium 235 and uranium 238 retained in the incinerator 13 resulting from combustion. Specifically, the ion chamber and sodium iodide detectors 55 respectively detect the total radiation and the energy distribution of the intercepted gamma rays. Ionization chamber detectors 55(2) are useful in this invention because of their sensitivity to total gamma ray energy and their insensitivity to temperature. On the other hand, sodium iodide detectors 55(1) provide indications indicative of the complete energy distribution of the gamma rays intercepted under temperature below 150° F. required for reliable operation. The ionization chambers utilized herein are preferably purchased from LND, Inc. of Oceanside, N.Y. These are typically fitted with two type 5120 LND Series 512 detectors, filled with a high density inert gas, for example 25 atmospheres of argon. Incident gamma rays cause the gas to ionize, which creates charged particles including electrons which migrate to an electrode to establish a flow of current across the ionization chamber.

Having two kinds of detectors provides diversity guarding against common mode failure, i.e., one defect degrading all the detectors. Distributing several detectors throughout the incinerator system insures a close view of all portions of the incinerator 13 for excess uranium accumulations.

FIGS. 5A through 5E show an ionization chamber detector 55(2) in various views and cross-sections. The detector 55 is mounted in a shield container 55' placed adjacent the incinerator containment near a radiation permeable window 44. As shown, the ion detector 55(2) is spherical. The shield 55' holding the detector 55 has a cylindrical body 110 and provides a seat 120 at a bottom opening 121 thereof to hold the detector 55. The shield 55' has a top 130 which can be bolted into place on the cylindrical body 110. Extensions 131 from the cylindrical body 110 and the top 130 are suitably coupled together for operations with bolts (not shown). Brackets 55'' extend from the shield 55' for mounting the detector 55 on the incinerator 13 or onto the floor 150 below the incinerator 13. The shield 55' is made of a steel shell 161 containing a core 162 of lead. The top 130 includes a steel plate 170 and steel sides 171 extending over a lead disk 172. The steel plate 170 is mounted onto a lead disk 172 with bolts 173 as shown.

FIGS. 6A through 6E show several views and cross-sections of a sodium iodide detector 55(1) mounted in a shield container. The sodium iodide detector 55(1) is long and cylindrical as is its shield 55' which includes a core 162 of lead encased in a steel shell 161. Tabs 201 extending from the shield 55' permit the detector 55(1) to be held in place. A steel cap 209 including top and sides is mounted on the shield 55'. A lead 247 from the detector 55(1) passes through a suitable penetration 249 in the side of the steel cap 209. A bracket 270 on the shield 55' permits the detector 55(1) and shield 55' to be suitably mounted with respect to the incinerator 13 adjacent a window 44 thereof.

Figure 7A:
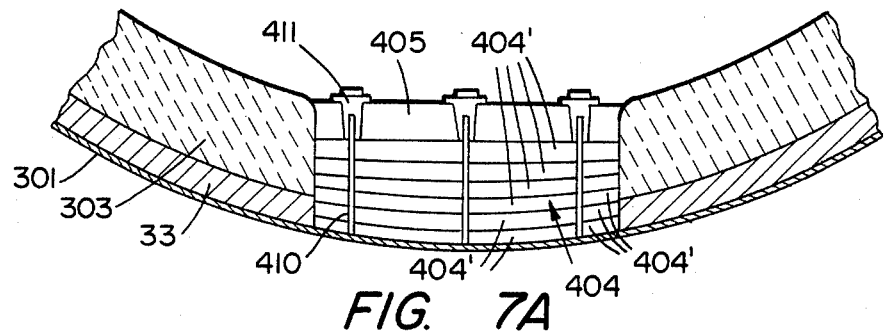
FIGS. 7A and 7B show a typical installation plan and section 7A—7A thereof respectively for a low density refractory window in the incinerator containment.
Figure 7B:
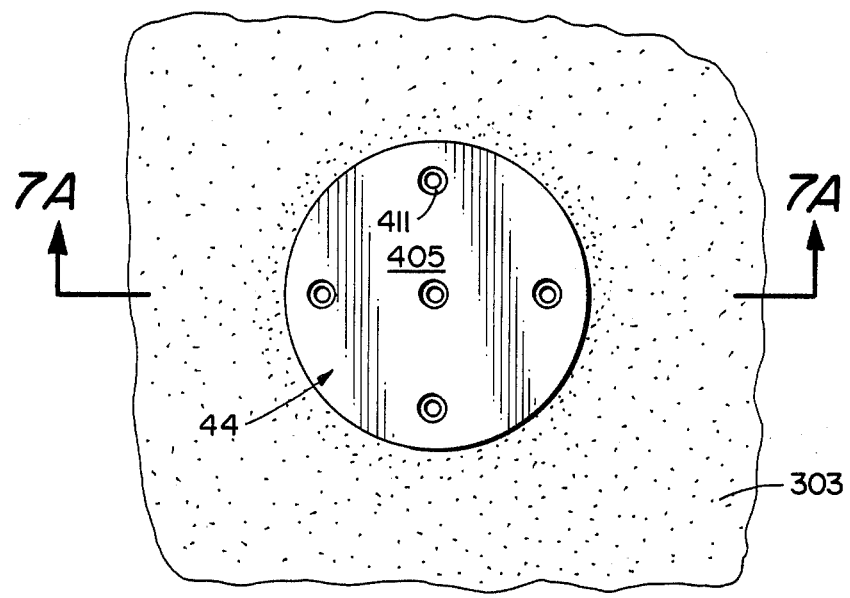

In each case, the detector 55 cooperates with a low density window 44 in the containment of the incinerator 13. The containment includes a steel casing 301, a 2-inch layer of refractory brick 33 and a 5-inch layer of another refractory material 303 as shown in FIG. 7A. In the window 44, low density refractory materials 404 are provided including 6 one-inch thick blanket layers 404' of a low density refractory material such as Fiberfax, a mass of ceramic fibers composed of alumina and silica with some trace constituents marketed by the Carborundum Company, which is compressed to 5 inches. The blanket layers 404' are held in place with a 2-inch thick thermal board 405 for example Carborundum Thermoter Board, anchored in place by an arrangement of five metallic studs 410 set in ceramic anchors 411 and coupled to the steel casing 301 of the incinerator 13. The placement of the studs 410 and anchors 411 is shown in the installation plan of FIG. 7B. The ceramic anchors 411 are 6 inches long. The outer diameter of the thermal board 405 is 18 inches. The thermal board 405 is approximately one-inch thick and has a density on the order of 18 pounds per cubic foot. The refractory felt 404' has a density of about 8 pcf. More specifically, the density of the incinerator materials employed generally ranges between 125 and 130 pcf. The radiation detectors 55 herein are generally positioned adjacent a window 44 of refractory materials having a density of approximately 11 pcf. This results in a density difference between walls and windows of the incinerator 13 on the order of ten to one.

The radiation 55 detectors herein are preferably connected with circuitry such as that shown in FIGS. 8A and 8B. FIG. 8B shows ionization detectors 55(2) which provide a fixed pulse current indication of intercepted gamma rays. Leads 601 from the detectors preferably plug into a 7028 low current scanner card 610 which is mounted in a 702 scanner frame 611. A lead 612 from the scanner frame leads the current pulse to a 6169 ion chamber interface 622, effective for adapting the current pulse for interpretation by a Keithly 616 digital scanning electrometer 633. The electrometer is coupled to a DEC 1134 mini-computer 644 having a 6162 isolated output 645 and a Kinetic Systems 3472F18 input gate 655 as shown in FIG. 8B. Detector scanning is controlled by the Keithly 702 Scanner, 611, and the Kinetic System 3072 CAMAC interface 656. Accordingly, an indication of the total amount of the accumulated uranium is generated.

FIG. 8A shows a sodium iodide detector system for producing voltage pulse indications proportional to the energy of intercepted gamma rays. A scintillating crystal (not shown) in the sodium iodide detector 55(1) produces an amount of light indicative of the energy of an integrated gamma ray. A phototube (not shown) in the detector 55(1) multiplies the effect of this light and develops a signal proportional to the energy of the gamma ray.

Each of the sodium iodide detectors 55(1) has a high voltage power supply 801 and a preamplifier 802 to condition the output signal from the detector and provide an indication of accumulated uranium to an amplifier 803 and a mixer/router 805, such as the type 8220 Canberra mixer/router 805 employed herein. Other preferred equipment includes a Harshaw 3 by 3 sodium iodide detector 55(1); a Canberra 2007P preamplifier 802; a Canberra 2012 type amplifier 803; and a LaCroix 4032 high voltage power supply 801.

The outputs from the sodium iodide detectors 55(1) are labelled by the mixer/router (805) according to detector origin. An 8070 ADC (811) reads the mixer/router 805 output, labels each voltage pulse, and digitizes the pulse time as an indication of the gamma ran energy. The ADC thus determines the channel number of the series 4070 multi-channel analyzer MCA 812 which is incrementated to indicate the energy level of the intercepted gamma ray. The series 4070 MCA 812, preferably a micro-processor having a 3×8 K byte RAM is fed into a DEC PDP 1134 computer 644. Thus, the computer 644 controls the MCA in clearing its registers and selectively taking data. For example, the computer 644 may direct the MCA 812 to take 1000 seconds of data at a time and then turn itself off. The computer 644 additionally controls inquiries on task completion and polls the MCA 812 to collect data. This data can be transferred immediately to an RL02 disk and filed by detector number and type. Having collected the data, the computer 644 reinitializes the MCA 812 and analyzes the gamma ray energy according to a "gamma M" routine from Canberra.

In operation, (return to FIG. 1) boxes of contaminated materials 900 are brought to the forklift loading station (not shown) at a high bay concrete block building housing the incinerator 13 shown in FIG. 1. The forklift suitably positions a queue of 4×4×4 foot boxes containing such waste materials as clothing, rubber shoes, covers, paper, cleanup rags, paper towels, plastic bags, and other combustible material contaminated with uranium. These boxes then trundle along the roller conveyor 16 to a box-scanner station 900 at which the boxes are weighed and scanned for U235 and U238 content. Based upon these results, a turntable station 907 directs the specific box out of the system along an exit path 911 or toward a scissors lift to elevate the box to a box loader 930.

The door 944 of the incinerator is open to receive the box and an external ram 66 inserts the box into the primary burn chamber 57 seen in FIG. 3 at an upper level or plateau 83. When the door 944 closes, the box ignites in oxygen starved conditions under the influence of burning natural gas. After a period of time, the door 944 reopens and a second box is pushed onto the upper plateau 83 causing the first box or remnants thereof to drop to a lower level 82 of the incinerator 13.

Combustion thus continues for a predetermined time until a hydraulic plow 77 including a heat resistant ram of castable ceramic pushes the burning residue of the first box onto the lowest level 82 of the incinerator 13 and the external ram 66 is able to push yet another box onto the upper plateau 83, which box in turn pushes the remainder of the second box onto the level 81 just cleared of the residue of the first box.

When the material on the lowest level 82 has been completely burned, the guillotine door 99' at the output side of the incinerator 13 can be opened and the lower hydraulic ram 77 pushes the remaining material into an ash trough 99 of the cooling chamber 997. After a cooling period, the transverse ram 999 of FIG. 1 clears the trough 99 and deposits the cooled ashes into an ash collector or can 1001. The uranium in these containers can be recovered by separation from the ash material therein.

The foregoing description is susceptible of reasonable modification that may occur to those skilled in the art. However, this invention is not meant to be limited to the embodiment just shown and described. The claims set forth the inventive concepts and are intended to cover all modifications coming within the spirit and scope of the invention described herein.

What is claimed is:

1. An incinerator for burning combustible material contaminated by radiation whereby radioactive ash is a combustion product, comprising a combustion chamber having containment walls of high density refractory brick provided with at least one window opening through said high density refractory brick containment walls comprising a low density body of ceramic fibers whereby any radiation from residual radioactive ash within the incinerator containment and inhibited by the high density refractory brick can penetrate outward through the window of low density fiber to beyond the incinerator containment walls, and a radiation detector mounted outside the incinerator containment walls adjacent to the said window of low density ceramic fiber for measuring any radiation passing out from the combustion chamber through the low density window whereby the amount of retained radioactive ash accumulted in the incinerator combustion chamber is indicated.

2. The incinerator of claim 1, wherein a steel casing surrounds the high density refractory walls defining the combustion chamber, with the radiation detector mounted outside of said steel casing adjacent to the window.

3. The incinerator of claim 1, wherein several of said low density windows are distributed at spaced intervals in said high density refractory walls, whereby the distribution of accumulations of radioactive material is detectable with external detector means.

4. The invention of claim 1, wherein a floor of refractory material including multiple levels is monitored by radiation detectors.

5. The incinerator of claim 1, wherein said detector means includes ion chamber type gamma ray detectors.

6. The incinerator of claim 1, wherein said detector means includes sodium iodide type gamma ray detectors.

7. An incinerator for burning combustible material contaminated by radiation whereby radiocative ash is a combustion product, comprising a combustion chamber having containment walls of a steel casing lined with high density refractory brick provided with at least one window opening through said steel casing and high density refractory brick containment walls comprising a low density of ceramic fibers whereby any radiation from residual radioactive ash within the incinerator containment and inhibited by the steel and high density refractory brick can penetrate outward through the window of low density fiber to beyond the incinerator containment walls, and a radiation detector mounted outside the steel and refractory brick incinerator containment walls adjacent to the said window of low density ceramic fiber for measuring any radiation passing out from the combustion chamber through the low density window whereby the amount of retained radioactive ash accumulated in the incinerator combustion chamber is indicated.

8. The incinerator of claim 7, wherein the density differences between the high density refractory brick of the containment walls and the low density ceramic fiber of the window is in the order of ten to one.

9. The incinerator of claim 7, wherein there are a plurality of windows of low density ceramic fiber openings through the steel casing and high density refractory brick containment walls and a plurality of cooperating radiation detectors mounted outside the incinerator containment walls of the steel casing and high density refractory brick adjacent to the windows of low density ceramic fiber.

* * * * *